US009623992B2

(12) United States Patent
Davi et al.

(10) Patent No.: US 9,623,992 B2
(45) Date of Patent: Apr. 18, 2017

(54) DEVICE FOR THE ACCUMULATION AND RELEASE OF PRODUCTS, IN PARTICULAR FOR SUPPLYING PACKING LINES FOR SUCH PRODUCTS

(71) Applicant: CT PACK S.R.L., Crespellano di Valsamoggia (IT)

(72) Inventors: Daniele Davi, Ferrara (IT); Bruno Alberti, Lido di Pomposa-Comacchio (IT); Andrea Querzoli, Ferrara (IT)

(73) Assignee: CT PACK S.R.L., Crespellano di Valsamoggia (BO) (IT)

( * ) Notice: Subject to any disclaimer, the term of this patent is extended or adjusted under 35 U.S.C. 154(b) by 0 days.

(21) Appl. No.: 15/010,485

(22) Filed: Jan. 29, 2016

(65) Prior Publication Data

US 2016/0221756 A1   Aug. 4, 2016

(30) Foreign Application Priority Data

Feb. 3, 2015 (IT) .............................. PD2015A0022

(51) Int. Cl.
| | |
|---|---|
| *B65B 35/54* | (2006.01) |
| *B65B 35/30* | (2006.01) |
| *B65G 47/51* | (2006.01) |
| *B65G 47/90* | (2006.01) |
| *B65G 1/127* | (2006.01) |
| *A23G 7/00* | (2006.01) |

(52) U.S. Cl.
CPC ............ *B65B 35/54* (2013.01); *A23G 7/0037* (2013.01); *B65B 35/30* (2013.01); *B65G 1/127* (2013.01); *B65G 47/5109* (2013.01); *B65G 47/901* (2013.01); *A23G 7/0025* (2013.01); *B65G 2201/0202* (2013.01); *B65G 2201/0235* (2013.01)

(58) Field of Classification Search
CPC ..... B65B 35/54; B65B 35/30; B65G 47/5109; B65G 47/901; B65G 1/127
USPC ............ 198/347.1, 817; 414/331.01, 331.08, 414/331.09, 331.16, 237, 238
See application file for complete search history.

(56) References Cited

U.S. PATENT DOCUMENTS

| | | | | |
|---|---|---|---|---|
| 1,837,605 A | * | 12/1931 | Baker .................... | A23L 3/001 198/465.3 |
| 5,636,722 A | * | 6/1997 | Koop ...................... | A23G 7/00 198/347.1 |

(Continued)

FOREIGN PATENT DOCUMENTS

| | | | | |
|---|---|---|---|---|
| CH | 710232 A1 | * | 4/2016 | ......... B65G 47/5109 |
| EP | 1608573 A1 | | 12/2005 | |

*Primary Examiner* — Kaitlin Joerger

(74) *Attorney, Agent, or Firm* — Volpe and Koenig, P.C.

(57) ABSTRACT

A device for the accumulation and release of products arranged within containers comprises a main accumulation unit with a reception opening and a first delivery opening, the containers being guided between the openings. The device is provided with a second accumulation unit operationally in communication with the main unit and having a second delivery opening. The device uses an actuator for selectively moving containers loaded with products from the main accumulation unit to the second unit, in order to selectively by-pass the first delivery opening and enable containers to be unloaded at the second delivery opening provided in the second accumulation unit.

17 Claims, 7 Drawing Sheets

(56) References Cited

U.S. PATENT DOCUMENTS

| | | | | |
|---|---|---|---|---|
| 6,729,836 B2* | 5/2004 | Stingel, III | ............... | B65G 1/08 |
| | | | | 198/347.1 |
| 6,808,355 B2* | 10/2004 | Philipp | ................. | B65G 47/57 |
| | | | | 414/331.04 |
| 7,201,270 B2* | 4/2007 | Moeller | ................. | B65G 1/127 |
| | | | | 198/347.1 |
| 8,011,492 B2* | 9/2011 | Davi | ...................... | B65G 1/127 |
| | | | | 198/347.1 |
| 8,109,380 B2* | 2/2012 | Philipp | ................. | B65G 35/06 |
| | | | | 198/347.1 |
| 2002/0044857 A1* | 4/2002 | Dekker | .................. | B65B 27/02 |
| | | | | 414/331.13 |
| 2005/0175436 A1* | 8/2005 | Salm | ...................... | B65G 57/00 |
| | | | | 414/331.01 |
| 2005/0232732 A1* | 10/2005 | Philipp | ............. | B65G 47/5109 |
| | | | | 414/331.09 |
| 2011/0073437 A1* | 3/2011 | Bernardi | ............... | B65B 25/146 |
| | | | | 198/347.1 |
| 2015/0158677 A1* | 6/2015 | Philipp | ................ | B65G 47/643 |
| | | | | 198/347.1 |
| 2016/0221756 A1* | 8/2016 | Davi | ...................... | B65B 35/30 |

* cited by examiner

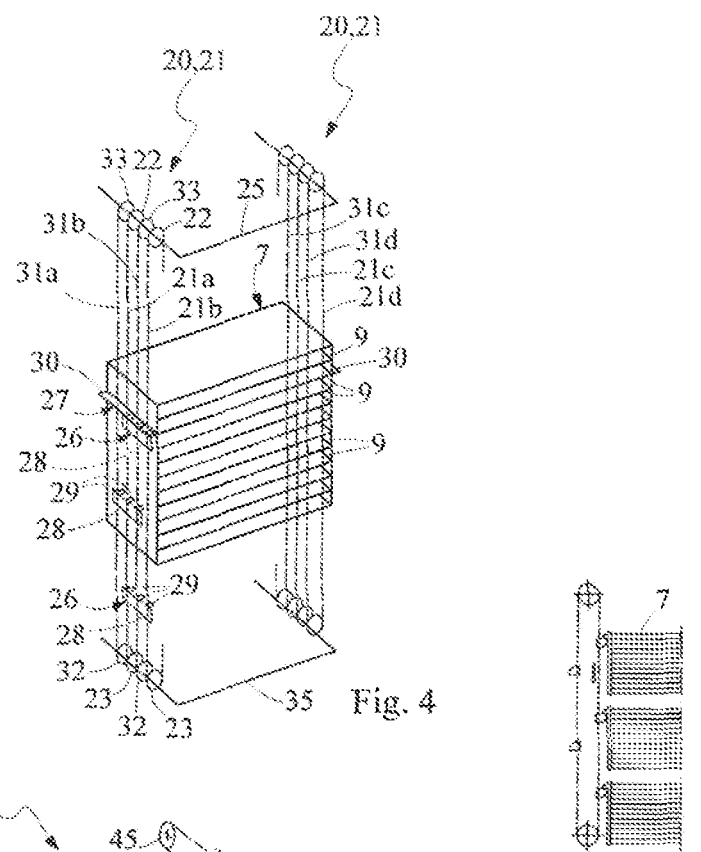
Fig. 4
Fig. 2
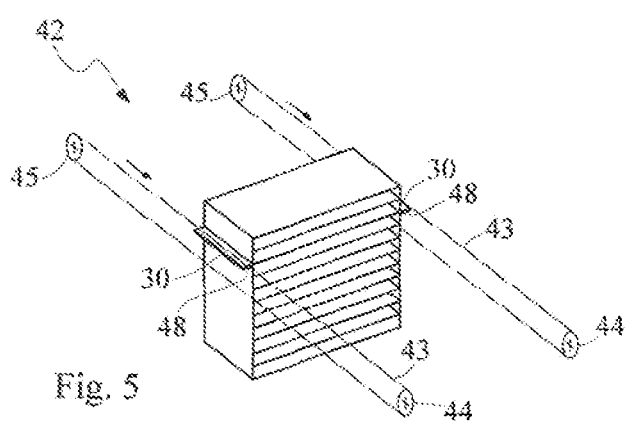
Fig. 5
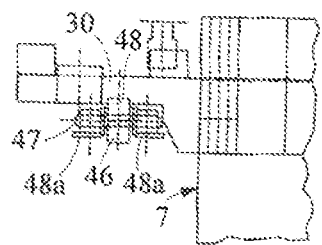
Fig. 6

DEVICE FOR THE ACCUMULATION AND RELEASE OF PRODUCTS, IN PARTICULAR FOR SUPPLYING PACKING LINES FOR SUCH PRODUCTS

FIELD OF THE INVENTION

The present invention relates to a device for the accumulation and release of products, in particular for supplying packing lines with such products.

BACKGROUND

Devices of the above-mentioned type are widely used in packing lines for confectionery products, such as bars of chocolate, biscuits or others of similar types, in which those products are moved on transport lines, for example, arranged in rows or groups of rows which are spaced apart from each other (the term "rows" is intended to be understood in the present context to be rows of aligned products in which the rows are arranged perpendicularly to the direction of advance of the products). There is typically interposed between those transport lines and the packing machines an accumulation unit for the products in order to allow a regular supply with a predetermined and uniform rate of the packing device, and thereby to make that supply independent of the speed and the variations of the flow of the rows arriving.

With those accumulation units, therefore, it is possible to efficiently supply different automatic packing lines having supply speeds and rates which are programmed in accordance with the type of products processed. Typically, those accumulation devices comprise a store, inside which there are supported and conveyed a plurality of container elements in series along a trajectory which optimizes the capacity of accumulation. Generally, the containers are regularly spaced apart from each other at a predetermined interval and each of them comprises a plurality of levels which are capable of supporting and containing respective rows of products. It is typical to provide one or more transport chains on which the containers are retained at a regular interval. The sliding trajectory of the chain is further selected in such a manner that each container is sequentially guided to the reception opening in order to load on each of the levels thereof one or more rows of products arriving at the accumulation unit and, at the same time, a previously loaded container is conveyed, by the effect of the movement of the chain, to the delivery opening in order to release the products being discharged from the accumulation unit.

Accumulation devices of this type provide for an ascending vertical portion of the chain in order to sequentially load the containers through the reception opening and a descending vertical portion of the chain in order to position the containers in the region of the delivery opening and to unload the products from the accumulation unit as a result.

An example of an accumulation device of the above-mentioned type is described in the European Patent No. 1608573.

A discernible limit in this type of accumulation devices involves the fact that a possible interruption during the discharge of products through the delivery opening from the accumulation unit, for example, as a result of breakdowns or maintenance operations on the line of the discharge transporters (so that it is necessary to stop the transporters downstream of the accumulation unit), involves the consequent interruption of the product supply to the packing machines which are positioned downstream of the accumulation unit, with obvious consequent disadvantages for the productivity of the overall installation. Only when it is possible to restart the system of discharge transporters which receive the products through the delivery opening of the accumulation unit, is it possible to take up again the regular rate of supply of the packing lines which are arranged downstream of the accumulation unit. Furthermore, in the case of temporary interruptions to the product discharge line from the accumulation unit, it is also possible to compromise the regularity and rate of supply of the products arriving at the accumulation unit. In this case, once the accumulation unit has become full, with all the containers inside it being full, it is necessary to stop the movement of the transporters which supply the accumulation unit, with obvious disadvantages for the efficiency and productivity of the devices of the installation arranged upstream of the accumulation unit.

The problem addressed by the present invention is to provide a device for the accumulation and release of products, which is structurally and functionally configured to allow the limitations set out with reference to the cited prior art to be overcome.

SUMMARY

This problem is solved by the invention by means of a device for the accumulation and release of products, which is constructed in accordance with the appended claims.

BRIEF DESCRIPTION OF THE DRAWINGS

Other features and advantages of the invention will be better understood from the following detailed description of a preferred embodiment thereof which is illustrated by way of non-limiting example with reference to the appended drawings, in which:

FIG. 2 is a partial schematic front elevation of the device of FIG. 1, FIG. 4 is a schematic perspective view of a detail of the device of the preceding Figures, FIG. 5 is a schematic perspective view of another detail of the device of the preceding Figures, FIG. 6 is a partial front elevation, drawn to an enlarged scale, of a detail of FIG. 5, FIGS. 7, 8 and 9 are partial perspective views of details of the device of the preceding Figures.

DETAILED DESCRIPTION OF THE PREFERRED EMBODIMENTS

With reference to the cited Figures, there is generally designated 1 a device for accumulating and releasing products P which are arranged in rows, which device is constructed according to the present invention. Though the arrangement of the products in rows represents a preferred selection, it will be understood that the device of the invention may also be used in the case in which the products take up other configurations, but not specifically ordered in rows.

Figure 1:
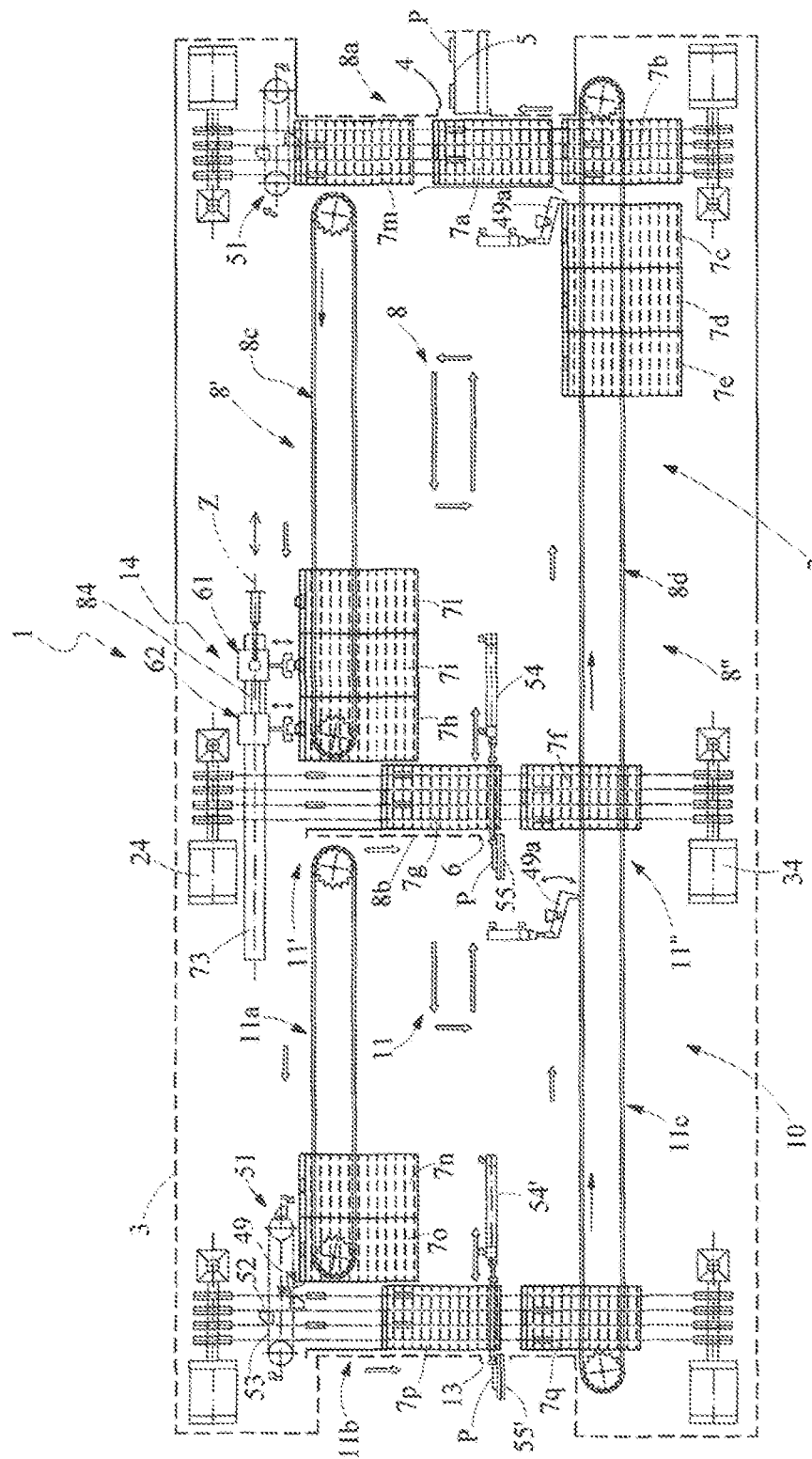
FIG. 1 is a schematic lateral elevation of an accumulation device according to the present invention in an operating functional step.

The device comprises a main accumulation unit 2 which is supported by a fixed structure, not illustrated in the Figures, the outer containment body or casing 3 of which is schematically illustrated with a broken line in the views of FIGS. 1 and 2.

The main accumulation unit 2 is of the type described in European Patent No. 1608573 and that description is entirely incorporated herein by reference for any detail or particular feature which is not expressly indicated below.

The main accumulation unit 2 is provided with a reception opening 4, through which there are introduced the products P which are distributed in rows arriving at a supply belt 5, and a delivery opening 6 for releasing the products P being discharged from the accumulation unit 2.

The accumulation device 1 further comprises a plurality of container elements 7 which are movably guided inside the accumulation unit 2 between the openings 4 and 6 along a closed-loop trajectory 8, which includes a first and a second trajectory portion which are designated 8' and 8", respectively, in continuation of each other.

The containers 7 which are loaded with products are moved along the first trajectory portion 8', which extends from the reception opening 4 in the direction of the delivery opening 6, while the containers 7 which have previously been emptied of products P are moved along the second trajectory portion 8" which extends from the delivery opening 6 towards the reception opening 4.

In greater detail, the trajectory 8 is defined by four respective branches which have a rectilinear extent and which are designated 8a, 8b, 8c and 8d, with a rectangular configuration, at least in the lateral elevation of FIG. 1, where the pairs of branches 8a, 8b and 8c, 8d are parallel with and opposite each other. Advantageously, the branches 8a and 8b have a vertical extent, the term "vertical" being intended to be understood to be the direction perpendicular to the support plane on the bottom of the accumulation unit 2, along which the reception opening 4 and delivery opening 6 are located, respectively. On the other hand, the branches 8c, 8d extend in a "horizontal" direction, that is to say, parallel with the support plane of the main accumulation unit 2. Each container element 7 has a plurality of supporting surfaces all designated 9 which are located one above the other and spaced apart from each other with a regular interval and which are capable of receiving one or more rows of products arriving from the belt 5. The container elements 7 are sequentially conveyed along the trajectory 8 (in a counter-clockwise direction when viewing FIG. 1) in order to bring each container 7 to be filled in the region of the opening 4, for the purpose of loading on the surfaces 9 the rows of products P which are supplied by the belt 5, as well as in order to convey the containers 7 which have been filled beforehand in the region of the delivery opening 6 in order to release the products P being discharged from the accumulation unit.

In the trajectory 8, the branch 8a is the ascending branch for loading the containers 7 while the branch 8b is the descending branch for unloading the containers. The branch 8c is the accumulation branch of the containers 7 which are filled with products, along which branch the products are retained in a position adjoining each other, as will be explained clearly below. The branch 8d is the branch for transferring the containers 7, which are already unloaded along the branch 8b, and for accumulating the containers waiting to be loaded again along the ascending branch 8a.

In accordance with a main feature of the invention, the device 1 comprises at least one second accumulation unit 10 which is configured to be operationally in communication with the main accumulation unit 2, as will be appreciated more clearly from the description below. The accumulation unit 10 extends along a second trajectory 11. The second trajectory extends between a first end 11', in which it is operatively connected to the first portion 8' of the trajectory 8 of the main accumulation unit 2, so as to allow the passage of containers 7 (filled with products) from the main accumulation unit 2 to the accumulation unit 10, and a second end 11" in which it is operatively connected to the second portion 8" of the trajectory 8 of the main accumulation unit 2, so as to allow the transfer of containers 7 which are already emptied in the accumulation unit 10 into the main accumulation unit 2 through a delivery opening 13, in order then to be conveyed back towards the reception opening 4.

The delivery opening 13 is arranged along the trajectory 11 between the ends 11' and 11", as clearly illustrated in FIG. 1.

In the accumulation unit 10, the containers 7 are conveyed sequentially along the trajectory 11 (in a counter-clockwise direction when viewing FIG. 1) in order to bring each container 7 to the delivery opening 13 and, once emptied, to transfer it again into the main accumulation unit 2, in the direction of the reception opening 4.

In the region of the end 11' of the trajectory 11, the device 1 comprises actuating means which are generally designated 14 and which are capable of selectively moving containers 7 which are filled with products P from the main accumulation unit 2 to the accumulation unit 10 in order to selectively bypass the delivery opening 6 of the main accumulation unit 2 and to allow the unloading of those containers through the delivery opening 13 of the second accumulation unit 10.

In the accumulation unit 10, the trajectory 11 is defined by three respective branches which have a rectilinear extent and which are designated 11a, 11b and 11c and which extend consecutively relative to each other and which are orthogonal to each other in each pair of contiguous branches (at least with reference to the lateral elevation of FIG. 1), where the branches 11a and 11c are parallel with and opposite, as well as orthogonal to, the intermediate branch 11b. Advantageously, the branch 11b has a vertical extent, along which the delivery opening 13 is located while the branches 11a and 11c, 8d extend in the horizontal direction in alignment with the respective branches 8c and 8d of the main accumulation unit 2.

There are further provided actuating means of the containers 7 along the branches of the trajectories 8 and 11 of the respective accumulation units 2 and 10. It should be noted that the actuating means which are active along the branches 8a, 8b and 11b are structurally and functionally similar to each other and the description will therefore be limited to the means provided on the ascending branch 8a of the main accumulation unit 2, it being understood that corresponding and similar actuating means are provided for the descending branches 8b and 11b, and there being indicated, where appropriate, with the same reference numerals specific features which are common to the three branches mentioned. Similarly, actuating means which are structurally and functionally similar to each other are provided along the accumulation branches 8c, 8d for the main accumulation unit 2 and along the branches 11a and 11c for the accumulation unit 10, and therefore the description will be limited with reference to the single accumulation branch 8c, there being indicated, where considered appropriate, with the same reference numerals specific features which are common to the two pairs of branches 8c, 8d and 11a, 11c of the respective trajectories 8 and 11.

The actuating means which are provided for the movement of the containers 7 along the branch 8a comprise first and second separate driving means 20, 21 which are associated in sequence with one or other container 7, respectively, which are arranged in a successive manner with respect to each other, of each pair of containers which can be identified in the main accumulation unit 2 as in the accumulation unit 10. In other words, containers 7 which are consecutive relative to each other along the respective trajectory and which engage with the branch 8a (or the branch 8b or 11b) are actuated in a sequential manner, respectively, by the actuating means 20 and 21 so that one container and the other container of those containers 7 are conveyed towards and away from the reception opening 4 (or the corresponding delivery openings 6 and 13) with independent movements with respect to each other.

The first driving means 20 comprise two pairs of motorised chains 21a, 21b and 21c, 21d which are wound on respective toothed driving wheels 22 and return wheels 23 which also extend with the operating branches thereof parallel with the ascending branch 8a. There is designated 24 a servomotor which is capable of driving with synchronism the drive wheels of the chains 21a, 21b and, by means of a return system 25, the drive wheels of the opposite pair of chains 21c, 21d. Each pair of chains is further provided with respective support means which are generally designated 26 and which are capable of engaging with respective support counter-means 27 which are provided on the opposite sides of the containers 7 in order to lift them, along the ascending branch 8a of the accumulation unit 2 (or along the descending branches 8b, 11b). The support means 26 comprise respective plate-like elements 28 which are secured with a regular interval to each pair of chains 21a, 21b and 21c, 21d, from which there extend in the same direction and transversely support rollers 29 which are capable of interfering with portions of respective wings 30 which project from the opposite sides of the containers, as shown in FIGS. 4 and 5, the wings therefore constituting the support counter-means 27.

The second driving means 21 comprise in turn two pairs of motorised chains 31a, 31b and 31c, 31d which are wound on respective drive toothed wheels 32 and return wheels 33 which extend with the operating branches thereof parallel with the ascending branch 8a (and 8b, 11b). There is designated 34 a servomotor which is capable of driving with synchronism the drive wheels of the chains 31a, 31b and, by means of a return system 35, the drive wheels of the opposite pair of chains 31c, 31d. Each of the pairs of chains is further provided with respective support means which are generally designated 36 and which are structurally identical to the support means 26, which are capable of engaging with the engagement counter-means 27 which are provided on the opposite sides of the containers 7 in order to lift them, along the ascending branch 8a (that is to say, in order to support them along the descending branches 8b, 11b). The support means 36 are secured to the chains 31a-31d with a regular interval, which is advantageously equal to the one provided for the support means 26, the supports 26 associated with a pair of chains being spaced with respect to the supports 36 of the other pair of chains It may be noted, with particular reference to FIG. 4, how, at one side, the chains 21a, 21b, 31a, 31b and, at the other side, the chains 21c, 21d, 31c, 31d have return axes which are coaxial with each other with the operating branches of each of the pairs of chains being parallel and mutually spaced apart.

As indicated above, the actuating means provided along each of the descending branches 8b and 11b comprise first and second separate driving means which are also designated 20, 21 for simplicity and which in turn include two pairs of chains also designated 21a, 21b, 21c, 21d and 31a, 31b, 31c, 31d, respectively, and which have a structure identical to the chains associated with the ascending branch 8a, to the description of which reference may be made for any further details In this case, mutually consecutive containers 7 which engage with the branch 8b or 11b are also moved away from and towards the respective delivery opening 6, 13 with movements which are independent of each other.

In order to move the containers along the accumulation branch 8c, and also along the branch 11a, there are provided first transporting means which are generally designated 42 and which are capable of conveying in succession with respect to each other the containers 7 (filled with products P) into an assembled position abutting each other. Those means 42 comprise pairs of motorised chains 43 which are wound around respective drive wheels 44 and return wheels 45, and which have the operating branches thereof in an elongate state horizontally along the branch 8c. More specifically, there are provided pairs of double motorised chains which carry idling rollers 46 which are supported on pins 47 which constitute pins of two single chains which are beside and fixedly joined to each other (Figure). The rollers 46 are mounted so as to be idling and support the wings 30 of the containers 7, in the region of a channel 48 which is formed below in the wings themselves.

The chains 43 are in turn supported and guided in a sliding manner on guide profiles 48a which extend parallel with the branch 8c (and 11a) and which are connected to the fixed structure of the accumulation unit 2. During the movement of the chain 43, each container 7 is moved jointly therewith along the branch 8c, as a result of the friction developed during support contact of the wings 30 on the respective idling rollers 46. Stop means which are designated 49 are provided at the arrival end of the branch 8c (and of the branch 11a) and are capable of interfering with the container 7 in order to retain it (together with the remaining containers abutting it) in a unidirectional manner in the end position reached, independently of the movement of the chains, as a result of the relative sliding and/or rolling between the idling rollers and the wings of the containers. The accumulation of the containers 7 and the retention thereof is therefore ensured by the stop means 49 during the continuous movement of the chains 43.

For the movement of the containers 7 along the lower transfer branch 8d of the accumulation unit 2, and also along the branch 11c of the accumulation unit 10, there are provided second transporting means which are also generally designated 42 and which are structurally equivalent to the transporting means described above with reference to the branch 8c. In a preferred manner, there is provision for there to be, over the entire longitudinal extent defined by the branches 8d and 11c (in rectilinear continuation of each other), a single system of motorised chains with return wheels at the opposite longitudinal ends (FIG. 1).

The transporting means include a pair of double motorised chains 43 with idling rollers 46 for supporting the containers 7, for details of which reference may be made to the description set out above with reference to the branch 8c and which cooperate with stop means 49a in accordance with methods which are generally similar to those provided for in the branch 8c.

It may be noted that stop means 49a are provided both in the region of the end 11" of the branch 11c and in the region of the end of the branch 8d at the confluence with respect to the ascending branch 8a.

There is designated 51 a pusher system which is provided for transferring each container 7, over the travel along the trajectory 8, from the ascending branch 8a to the accumulation branch 8c of the main accumulation unit and also from the branch 11a to the branch 11b of the accumulation unit 10. The pusher system 51 is constructed, for example, with one or more pusher elements 52 which are secure in terms of movement with respect to a chain 53 (closed loop type) and which are capable of interfering with the container 7 in order to move the container from one branch to another in the region of the confluence of the branches over the trajectory 8 and 11, respectively.

There is designated 54 a pusher element which is conventional per se and which is associated with the main accumulation unit 2 and which is capable of moving the rows of products P from each support plane 9 onto a delivery belt 55, during the step of discharging the containers 7 and releasing the products being discharged from the main accumulation unit 2.

There is designated 54' a corresponding pusher element which is associated with the accumulation unit 10 and which is capable of moving the rows of products P from each support plane 9 to a delivery belt 55', during the step of discharging the containers 7 and releasing the products being discharged from the accumulation unit 10.

Each pusher element 54, 54' can be constructed as a single pusher element which acts in sequence on each level of the container in order to move the row of products P on the respective single discharge belt 55, 55' (see FIG. 1), that is to say, it can be produced as a pair of pushers which act on the container in order to discharge the rows of products on a respective pair of discharge belts (FIGS. 11-14). The inventive notion forming the basis of the invention may be applied to each of the above-mentioned configurations. Naturally, the provision of double pusher elements both for discharge from the accumulation unit 2 and for discharge from the accumulation unit 10 makes it possible to obtain greater versatility of the installation, being able in this case to supply four separate packing lines downstream of the accumulation units 2, 10.

Again with reference to the actuator means 14 which allow containers 7 to be moved from the main accumulation unit 2 to the second accumulation unit 10, the means comprise a pair of pusher devices which are designated 61, 62, each device being able to be associated with one or other of the containers 7 in mutual succession of each pair of containers of the plurality present inside the accumulation units 2, 10.

The pusher devices are movably guided, in a state fixedly joined to each other, over a linear translation path, the direction of which is designated Z and is parallel with the rectilinear extent direction of the branches 8c, 11a of the respective trajectories in the accumulation units 2 and 10.

Figure 7:
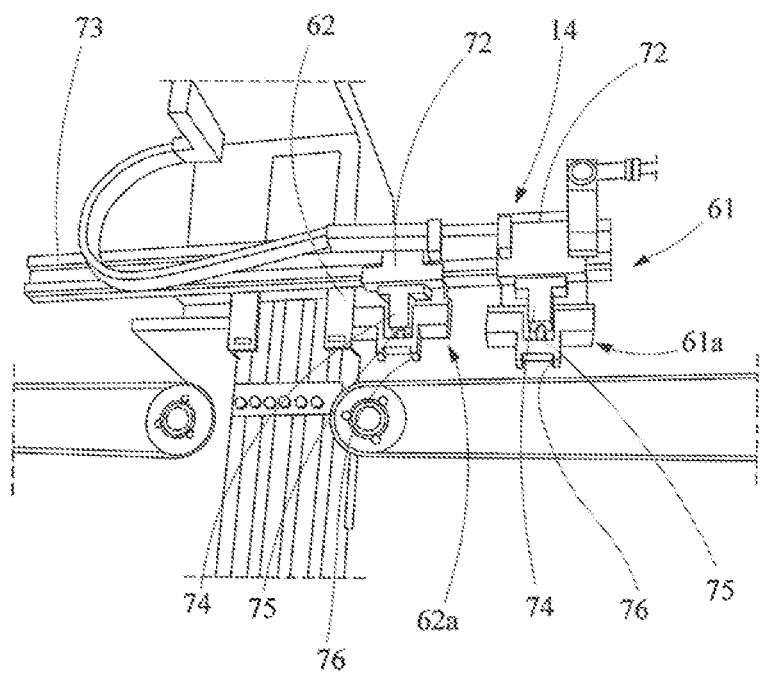
Figure 8:
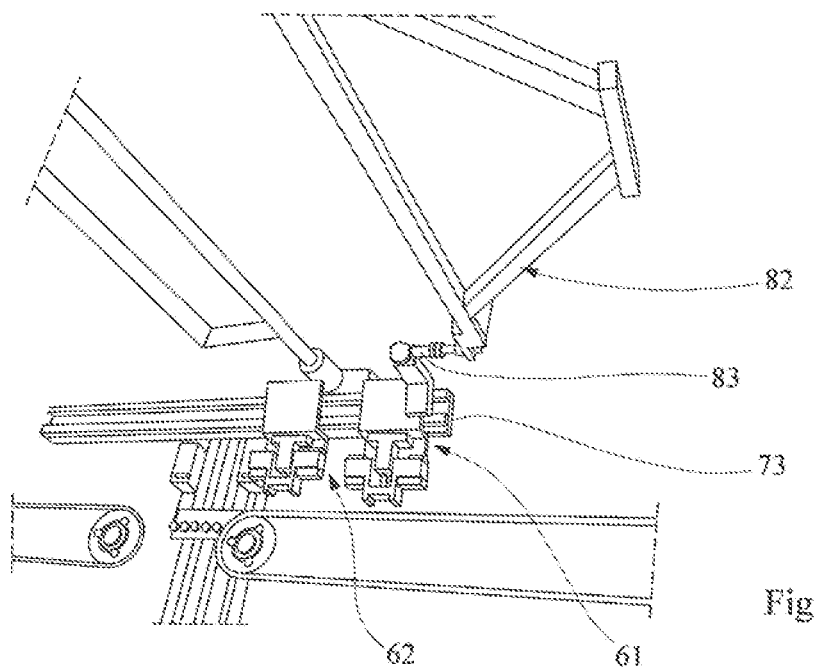
Figure 9:
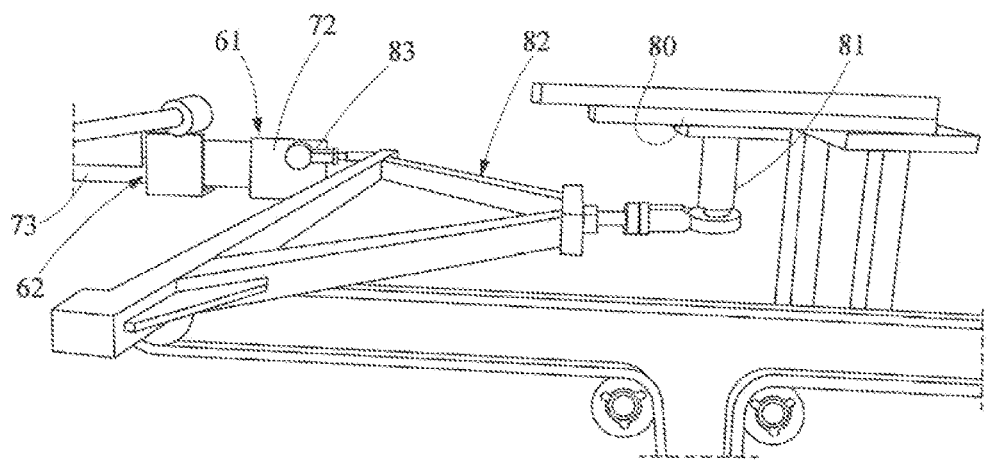
Figure 10:
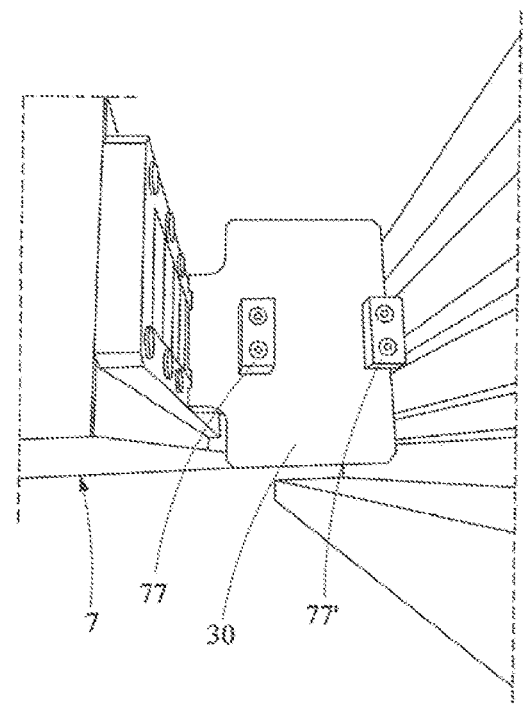
FIG. 10 is another perspective view of a detail of the device of the preceding Figures.

Each pusher device 61, 62 is further provided with a respective pair of pusher members 61a, b and 62a, b, respectively, wherein the respective members of each pair act on respective laterally opposite sides of the corresponding container 7. FIGS. 7 and 8 show the pusher members 61a, 62a of the respective devices which act on one of the lateral flanks of the respective containers, there acting at the opposite lateral flanks of the containers the pusher members 61b, 62b which are structurally identical to those illustrated in the Figures mentioned. In light of that structural identity, the description below will be limited only to a description of the pair of pusher members 61a, 62a, similar features which belong to the members of the same pusher device being indicated with the same reference numerals.

Each pair of pusher members 61a, b and 62a, b is provided with respective terminals 71, which are driven in a perpendicular direction to the translation direction course Z between a position for disengagement from the respective container 7 and a position for engagement with the respective container in order to urge the container in the direction Z, the respective pairs of pusher members 61a, b and 62a, b being driven in an independent manner away from each other during the respective movements between the positions mentioned in relation to the corresponding container.

In greater detail, each pusher member comprises a respective plate 72 which is guided linearly along a track structure 73, by means of which the translation path (outgoing and return) of the pusher devices is brought about.

Each guide track 73 extends in a manner straddling the first end 11' of the trajectory 11 between the accumulation unit 10 and the accumulation unit 2, and is selected to have a longitudinal dimension which is suitable for allowing the pair of pusher devices 61, 62 to transfer containers 7 from the accumulation branch 8c to the branch 11a of the accumulation unit 2 and/or the descending branch 8b of the accumulation unit 2.

There is mounted on each plate 72 a respective pneumatic cylinder type actuator 74, the operating rod 75 of which carries the corresponding terminal 71 at the free end thereof. The terminal 71 has a formation which carries an end slot which is defined by a recess 76. In the operating position involving engagement with the container, the recess 76 is brought (by means of the movement of the rod) into connection with a block 77 which is mounted on the respective lateral flank of the container, preferably projecting from the respective wing 30. The block 77 is positioned on the wing 30 with a predetermined spacing from a second block 77' which is suitable for cooperating with the stop means 49, 49a. The chain type transfer system of the pushers 51 also acts on the block 77 along the respective movement trajectories. As a result of the connection between the recess 76 and the block 77, the pusher member 61, 62 urges the container as a result of the movement thereof along the track 73. For the movement in the direction Z of the pusher devices, there is provided a common motorised linear actuator which is designated 80 and the operative terminal 81 of which is connected to a frame 82. The frame is arranged to be connected, by means of respective connecting rods 83, to each of the opposing plates 72 of the pusher device 61.

Each plate 72 of the device 61 is further fixedly joined to the plate 72 of the device 62 adjacent thereto, preferably by means of a screw stay 84 which has an adjustable length and which is only illustrated schematically in FIG. 1. In that manner, the devices 61, 62 move together along the translation path in the direction Z and the axial spacing between adjacent plates guided on the same track can be fixed in an adjustable manner. Alternatively to the screw stay, there may be provision for particular requirements for the connection between the plates 72 to be brought about by means of an actuator, for example, a motorised or pneumatic type actuator, in such a manner that the spacing between the plates is also readily adjustable during the operating steps involving movement of the containers inside the accumulation device.

With particular reference to FIG. 7, it will be observed that, in order to support the container 7 during the movement from the branch 8c of the accumulation unit 2 to the branch 11a of the accumulation unit 10, there is provision, in the region of the space occupied by the descending branch 8b, for a corresponding support means 26 (or 36) which is conveyed by the motorised chains of the branch 8b to be aligned horizontally with the rectilinear profile of the horizontal transport chains of the branches 8c and 11a, so as to support with the rollers 19 the corresponding wing 30 of the side of the container.

In order to afford a clearer understanding of the operation of the device according to the invention, reference may be made initially to an operating step, illustrated in FIG. 1, in which both the accumulation units 2 and 10 are operational and provide for a supply of rows of products P through the respective delivery openings 6 and 13. The container elements illustrated in FIG. 1 are individually designated 7a, 7b, 7c, 7d, 7e, 7f, 7g, 7h, 7i, 7l and 7m for those present inside the main accumulation unit 2, and 7n, 7o, 7p and 7q for those moving in the second accumulation unit 10 so as to facilitate the identification of the position thereof inside the respective accumulation unit.

In the main accumulation unit 2, in this initial reference operating step, the container 7a is positioned in the region of the reception opening 4 with the belt 5 in alignment with the upper support plane 9 of the container 7a in order to transfer a row of products P on that plane. The container 7a is raised by the driving means 20 by means of engagement with the chains 21a-21d. A sensor (not illustrated) is provided in order to detect the movement of the row and to drive the servomotor 24 in order to move the container 7a with an interval (equal to the spacing between consecutive planes 9) so as to complete the loading of all the support planes 9 with respective rows of products P.

In this step, the container 7b is disengaged from the accumulation branch 8d and it is positioned below the container 7a. The containers 7c, 7d, 7e are fixed in a position abutting the branch 8d by the stop means 49a. The container 7m, after the filling operation is complete, is raised until it is in alignment with the transport chains 43 for the transfer thereof on the branch 8c by means of the pusher system 51. The full containers 7h, 7i, 7l are retained so as to abut the branch 8c during accumulation.

The container 7g is moved by the chains 21a-21d which act on the branch 8b (by means of mutual engagement of the respective support means and counter-means 26, 27) with intermittent movement in the region of the delivery opening 6 along the descending branch 8b in order to allow the discharge of the rows of products P from the respective support planes 9. The container 7f is engaged with the chains 31a-31d after the discharge of the products onto the belt 55 has been carried out and is moved with a continuous movement in the direction of the accumulation branch 8d of empty containers.

The containers 7n-7q should be considered to have previously been transferred from the main accumulation unit 2 to the accumulation unit 10 in accordance with operating methods described in greater detail below. As a result of that transfer, the containers 7n, 7o are accumulated in the branch 11a and fixed in position by corresponding stop means. The container 7p is moved along the branch 11b by the corresponding pairs of motorised chains during intermittent movement which is suitable for allowing the emptying of the rows of products P, through the delivery opening 13. The container 7q beneath is engaged with the other pair of operating chains along the descending branch 11b, in order to be moved, after the discharge of products has been carried out, in the direction of the accumulation branch 11c, until it is blocked by the stop means 49a.

In accordance with the invention, there is provision for a first operating sequence in which the pusher devices 61, 62 can be actuated on the pair of containers 7h, 7i in order to move them into a configuration in which the container 7h is transferred on the branch 11a of the second accumulation unit 10 while the container 7i is moved on the descending branch 8b of the main accumulation unit 2. In order to reach that configuration, the pusher members are previously driven into engagement with the respective containers by means of control of the terminals 71 which are brought (by means of the recesses 76) into connection with the respective blocks 77, then the linear actuator 80 is actuated over the translation path Z in order to urge the pair of containers into the configuration of FIG. 3. In a subsequent step, by means of disengagement of the ends from the blocks, the container 7h is moved by the corresponding transporting means along the branch 11a of the accumulation unit 10 while the container 7i is moved by the corresponding pair of motorised chains of the branch 8b of the main accumulation unit 2. In this manner, by means of the pusher devices 61, 62, the container 7h can bypass the delivery opening 6 of the main accumulation unit in order to be conveyed to the delivery opening 13 of the accumulation unit 10.

A subsequent return translation path in the direction Z brings the pusher devices back into the initial position of FIG. 1, which are again ready to be activated on the successive pair of containers in order to repeat the operating sequence described.

Another operating sequence which can be brought about with the pusher devices 61, 62 provides for both the containers 7h, 7i to be transferred from the branch 8c of the main accumulation unit 2 to the branch 11a of the accumulation unit 10, extending in an advantageous manner the translation path in the direction Z of the pusher devices. If the delivery opening 6 of the main accumulation unit cannot supply products, for example, as a result of an interruption downstream of the packing lines, that sequence allows bypassing, for the time necessary, of the delivery opening 6, transferring the containers full of products to the second accumulation unit 10, discharging it through the delivery opening 13 thereof.

It will further be understood that, if there is produced an interruption downstream of the delivery opening 13 of the accumulation unit 10, it is possible to actuate another operating sequence in which the pusher devices 61, 62 are activated in order to move in sequence both the containers 7h, 7i along the descending branch 8b of the main accumulation unit 2, therefore excluding the transfer of containers into the second accumulation unit 10.

This sequence can, for example, provide for a single one of the devices 61, 62 to be activated cyclically on the last container (7h) which is accumulated at the end of the accumulation branch 8c.

By means of the operating sequences described above, it is therefore possible to control the release of the products from the accumulation units 2 and 10, bypassing one or the other in accordance with the conditions which are established downstream of the respective delivery openings, thereby preventing the complete stoppage of the accumulation device, in any case ensuring at least partially the supply of the packing lines which are arranged downstream of the accumulation units.

Figure 3:
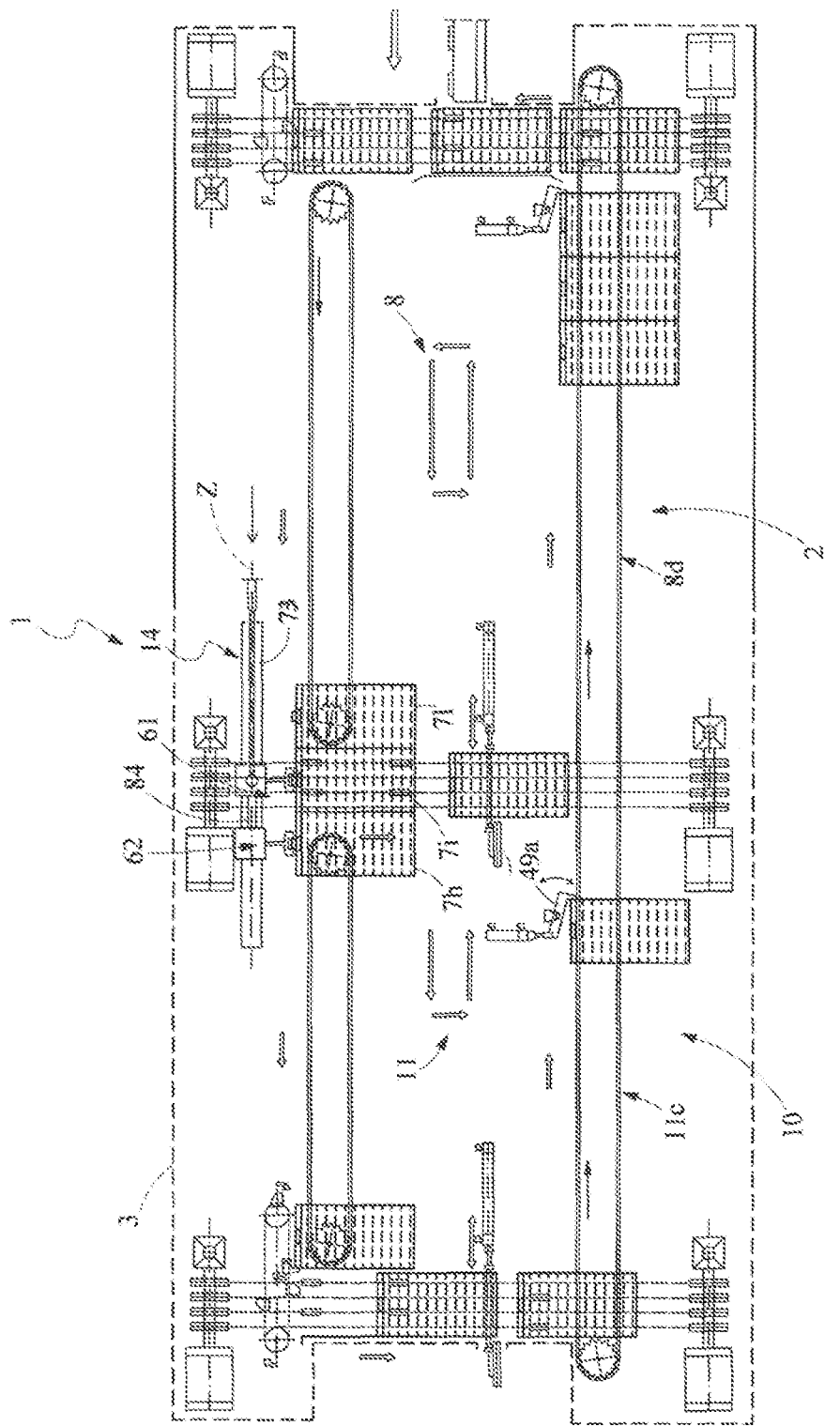
FIG. 3 is a view corresponding to that of FIG. 1, in a different operating step of the accumulation device according to the invention.

FIGS. 11 to 14 show an operating sequence which is similar to that of FIGS. 1 and 3, in an accumulation device in which, in the region of each delivery opening 4, 6, there is provision for a pair of delivery belts 55, 55' which are loaded by a respective pair of pushers 54, 54' which are capable of unloading the rows of products from the same container. In this manner, it is possible to supply four packing lines which are positioned downstream of the accumulation units with the accumulation units 2 and 10.

By means of the pusher devices 61, 62, therefore, it is possible to confront and resolve any interruptions on one or more of the four packing lines, advantageously and selectively intervening in the actuation of the pusher devices and the relative translation path actions from one accumulation unit to the other accumulation unit of the device.

Figure 11:
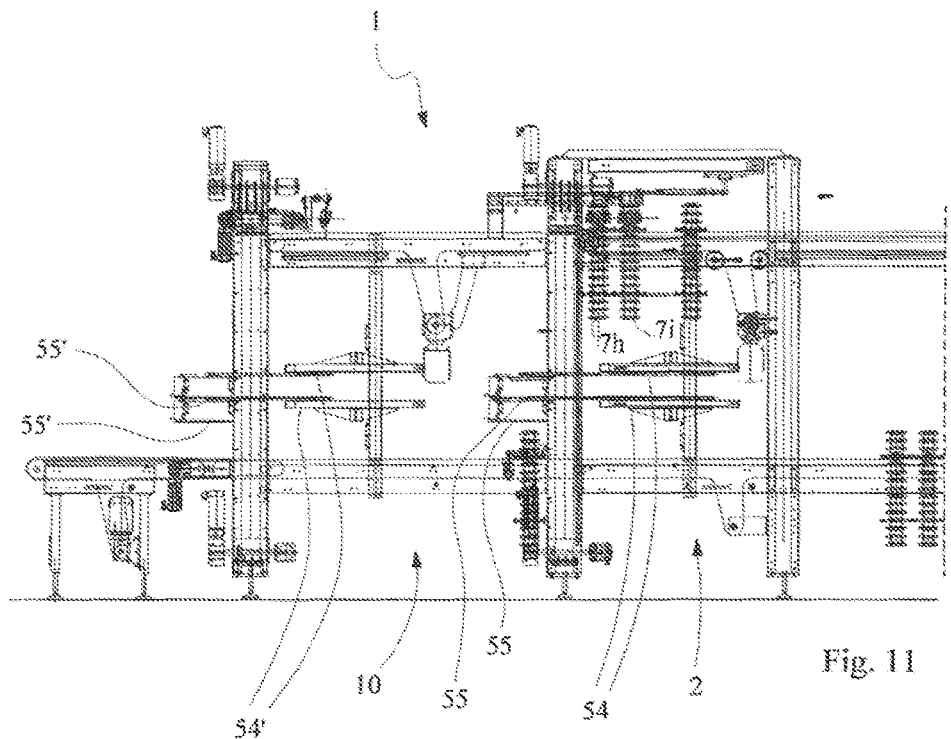
FIGS. 11 to 14 are partial schematic views of the device according to the invention in an operating functional sequence.
Figure 12:
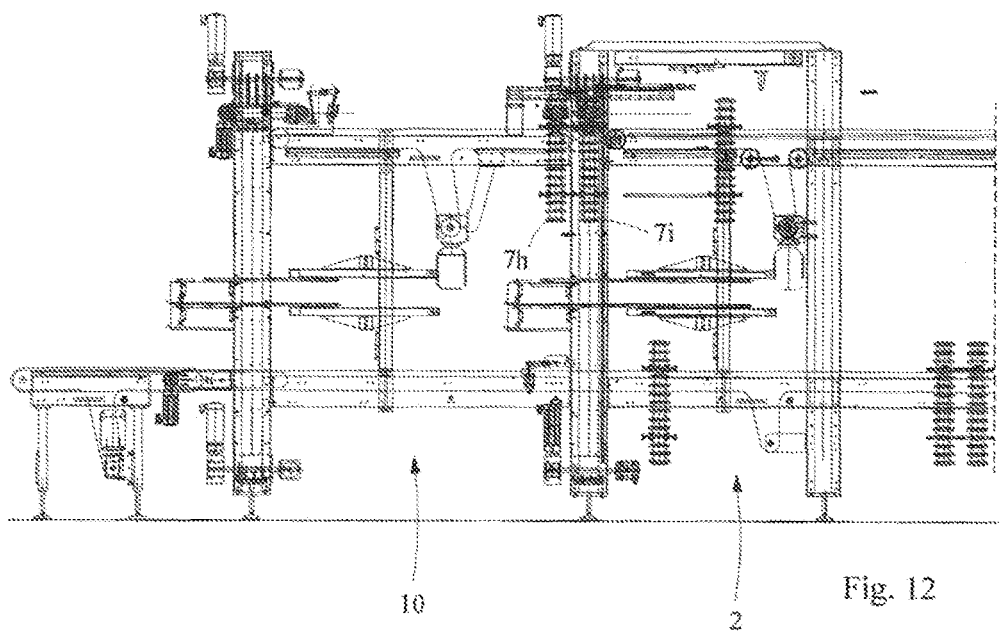
Figure 13:
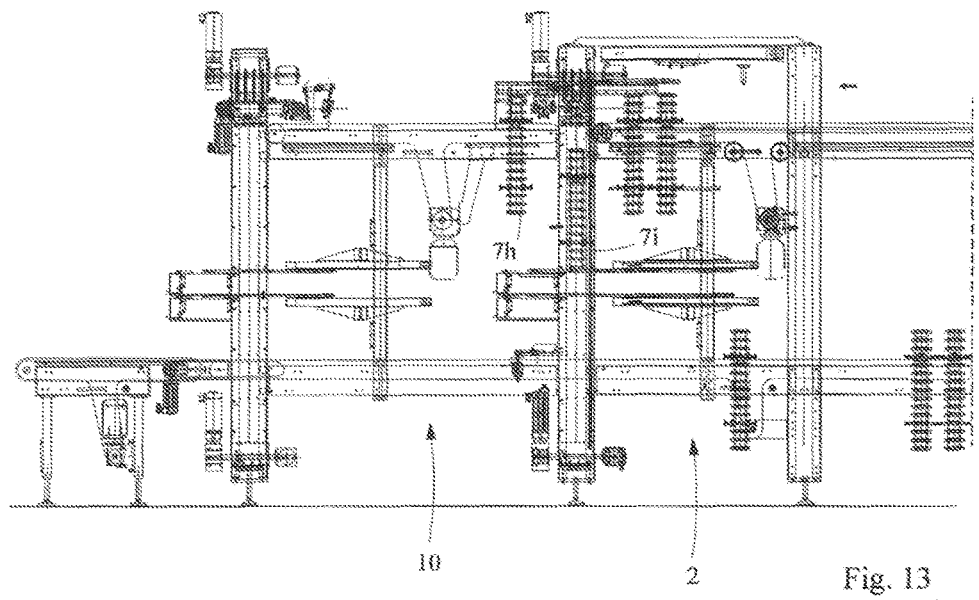
Figure 14:
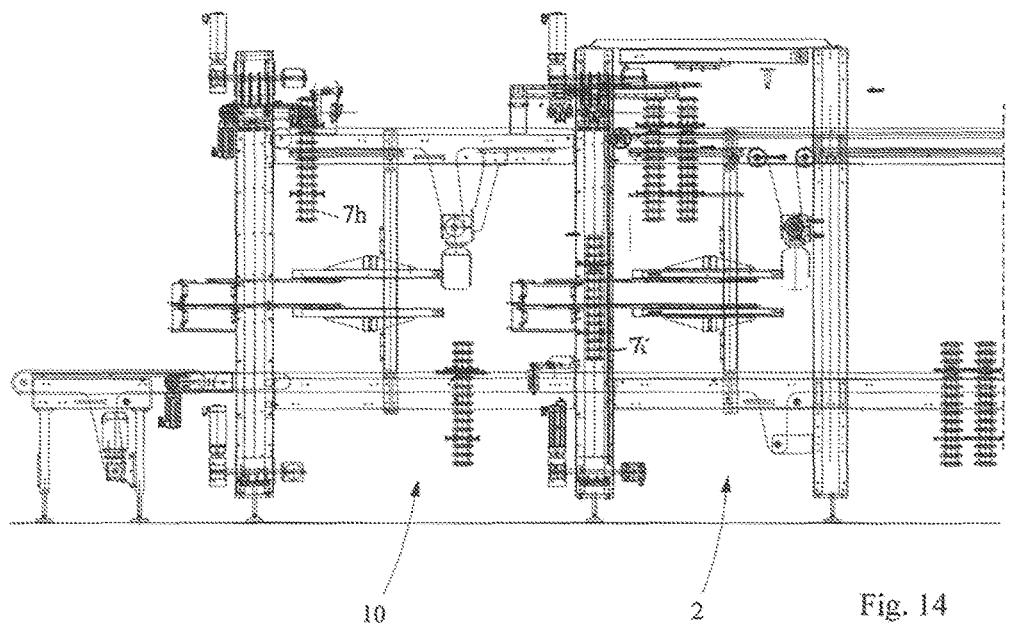

In detail, in FIG. 11 the containers 7h, 7i are in abutment with the end of the branch 8c during accumulation. In FIG. 12, following the activation of the pusher devices 61, 62, the container 7h is transferred to the branch 11a of the accumulation unit 10 and the container 7i is brought to the descending branch 8b in order to be moved in the direction of the delivery opening 6. In FIG. 13, the container 7i is moved along the branch 8b into a position in which the discharge step has started by means of activation of the double pushers 54. During that discharge step, shown in FIG. 14, the container 7h is transferred to the opposite end of the branch 11a and is ready to be moved along the descending branch 11b towards the delivery opening of the accumulation unit 10.

With reference to FIG. 13, if the interruption of the lines downstream supplied by the main accumulation unit 2 occurs when the container 7i is in the descent step along the branch 8b, but in a position which interferes with the possible horizontal movement of the container 7h which follows it, preventing the movement thereof from the branch 8c of the accumulation unit 2 to the branch 11a of the accumulation unit 10, there is provided another sequence in which the container 7h is caused to re-ascend along the branch 8b as far as the position suitable for the movement thereof into the accumulation unit 10 by means of the pusher devices. In this manner, it is prevented from blocking the delivery of products through both the accumulation units, ensuring a delivery rate, which is at least partial (through the accumulation unit 10), until the delivery of products being discharged from the main accumulation unit is restored.

It is also understood that the movement of the containers along the return trajectory which is defined by the branches 8d and 11c is advantageously controlled by means of the activation or not of the stop means 49a, for the purpose of preventing the production of occurrences of interference during the movement between the containers 7 which are unloaded through the discharge from the second accumulation unit and introduced into the main accumulation unit with the containers unloaded from the delivery opening of the main accumulation unit, all assembled along the branch 11c, in order to be conveyed to the reception opening 4.

It will further be understood that the number of containers provided in the accumulation device may vary in accordance with the specific requirements. It should be noted that the accumulation capacity is substantially linked with the number and the dimensions of the containers which can abut each other along the accumulation branches of the respective accumulation units and the storage volume can therefore be increased, for example, by horizontally extending one and/or other of the accumulation units and/or by increasing the number of support planes of each container.

The invention thereby solves the problem set out, achieving the advantages claimed above with respect to the known solutions.

It is further possible to produce an accumulation device according to the invention which provides downstream of the main accumulation unit for a plurality of additional accumulation units which are structurally and functionally equivalent to the accumulation unit 10 described above, which are arranged in sequence and which are operationally in communication with each other.

With the device of the invention, it is further advantageously possible in some cases to eliminate or reduce the number of conventional supply stations, which are generally positioned upstream of the accumulation device (buffer), with a consequent reduction in the space occupied during establishment and/or with a simplification of the general layout of the feeding installation.

The invention claimed is:

1. A device for the accumulation and release of products (P), comprising:

a main accumulation unit (2) with a reception opening (4) and a first delivery opening (6) of said products, a plurality of containers (7) movably guided inside said main accumulation unit (2) between said reception opening (4) and said first delivery opening (6) along a first trajectory (8), each container (7) being provided with a plurality of supporting surfaces (9) to contain products, said first trajectory (8) extending in a closed loop and including a first and a second trajectory portion (8', 8") extending from each other, along the first portion (8') of trajectory extending from the reception opening (4) in the direction of said first delivery opening (6) moving the containers (7) loaded with products, while along the second portion (8") of trajectory extending from said first delivery opening (6) towards the reception opening (4) moving the containers (7), emptied of products, actuating means being provided to drive the movement of said containers (7) in the main accumulation unit (2) so as to present in sequence each container (7) to be filled to the reception opening (4), in order to load incoming products onto the respective supporting surfaces of the container and to convey the previously filled containers (7) to the first delivery opening, in order to release respective products exiting the main accumulation unit (2), said actuating means comprising first and second distinct driving means (20, 21) associated respectively in sequence with one container (7) after another of each pair of containers (7) identifiable in said plurality of containers, so that both of said containers (7) are conveyed one after the other away from and towards said reception opening (4) and/or said first delivery opening (6) of the main accumulation unit (2) with movements independent of each other, at least one second accumulation unit (10) operationally in communication with the main accumulation unit (2) and extending along a second trajectory (11) on which there is provided a second delivery opening (13), said second trajectory (11) extending between a first end (11') in which it is operationally connected to the first portion (8') of the first trajectory (8) of the main accumulation unit (2), to enable the passage of containers (7) loaded with products from the main accumulation unit (2) to at least said second accumulation unit (10), and a second end (11") in which it is operationally connected to the second portion (8") of the first trajectory of the main accumulation unit, to enable the transfer into the main accumulation unit (2) of containers (7) already emptied into at least said second accumulation unit (10) through the second delivery opening (13), to be conveyed back to the reception opening (4), said second delivery opening (13) of at least said second accumulation unit (10) is located along said second trajectory (11) between said first and second ends (11', 11"), the device (1) further comprises actuating means (14) provided at the first end (11') of said second trajectory (11) capable of selectively moving containers (7) loaded with products from the main accumulation unit (2) to at least the second accumulation unit (10), in order selectively to by-pass the first delivery opening (6) and enable containers (7) to be unloaded at the second delivery opening (13) of at least said second accumulation unit (10).

2. The device according to claim 1, wherein said actuating means (14) comprise at least one pair of pusher devices (61, 62) that can be associated in sequence with one container (7) after another of each pair of containers of the plurality of containers, to move one and/or the other of said containers (7) towards the first (6) and/or the second delivery opening (13) respectively, in order to unload the products (P) from the main accumulation unit (2) and/or from at least the second accumulation unit (10).

3. The device according to claim 2, wherein said pusher devices (61, 62) are movably guided, connected together, along a linear translation path, each device comprising at least one respective pusher member (61a,b; 62a,b), driven in a transverse direction to said translation path between a non-operating position of disengagement from the respective container (7) and an operating position of engagement with the respective container (7), to convey the latter along said translation path, said pusher members (61a,b; 62a,b) being driven independently of each other in the respective movements between the said positions.

4. The device according to claim 3, wherein said pusher devices are driven along said path by a motorized linear actuator element (80) and said translation path extends so as to straddle said first end (11') between the main accumulation unit (2) and at least said second accumulation unit (10), with an extension such as to enable said pusher devices (61, 62) to transfer containers (7) from the first portion (8') of trajectory of the main accumulation unit (2) to the trajectory (11) of at least said second accumulation unit.

5. The device according to claim 4, wherein:

the first portion (8') of the first trajectory (8) of the main accumulation unit comprises a first straight branch (8c) extending in a first direction until near said first end (11') and is connected in operational extension to a second branch (8b) of said first trajectory (8) extending perpendicularly to the first branch (8c) in the direction of the first delivery opening (6), a third branch (11a) of the second trajectory (11) of at least said second accumulation unit (10) extends from said first end (11') in straight alignment with the first branch (8c), the second branch (8b) remaining interposed between the first (8c) and the third branch (11a) and directed perpendicularly thereto, the pusher devices (61, 62) being movable along said translation path parallel with the direction of development of said first (8c) and third branches (11a), the pusher members (61a,b; 62a,b) of the respective pusher devices (61, 62) being driven in a direction perpendicular to the direction of said translation path.

6. The device according to claim 5, wherein said pusher devices (61, 62) are arranged to move each pair of containers (7) accumulated in the first branch (8c) into an operating condition in which one container (7) of the pair is transferred onto the third branch (11a) of the second accumulation unit (10) in order to be unloaded through the second delivery opening (13) and the other container (7) of the pair is moved onto the second branch (8b) in order to be unloaded through the first delivery opening (6) of the main accumulation unit (2).

7. The device according to claim 5, wherein said pusher devices (61, 62) are arranged so as to move both containers (7) of each pair of containers accumulated in the first branch (8c) onto the third branch of trajectory (11a) in order to be unloaded through the second delivery opening (13) of at least the second accumulation unit (10), by-passing the first delivery opening (6) of the main accumulation unit (2).

8. The device according to claim 5, wherein said pusher devices (61, 62) are arranged to move in sequence each container (7) of each pair of containers accumulated on the first branch (8c) onto the second branch (8b), in order to feed said containers (7) in sequence exclusively to the first delivery opening (6) of the main accumulation unit, with no transfer of containers into the second accumulation unit.

9. The device according to claim 1, wherein said first and second drive means (20, 21) comprise motorized transport chains.

10. The device according to claim 9, wherein said first and second drive means (20, 21) comprise respectively at least one first (21a, 21b; 21c, 21d) and at least one second (31a, 31b; 31c, 31d) pair of chains in a closed loop, the chains of each pair being provided with respective support means (26, 36) capable of cooperating with respective supporting counter-means (27) provided on each of said containers (7) to transport the latter along at least part of the operating branches of said chains, so that containers (7) filled with products are driven, one after the other, by one pair of chains and the other, with one container (7) moving independently in relation to the other, away from and towards said first delivery opening (6), in the main accumulation unit (2), to release products (P) from the accumulation device, or away from and towards said reception opening (4) to load products into the containers.

11. The device according to claim 1, wherein the first and second drive means are further provided in the second accumulation unit to drive the movement of said containers (7) so as to present in sequence each container, arriving from the main accumulation unit (2), to the second delivery opening (13), in order to release respective rows of products (P) exiting the second accumulation unit, and to drive the unloaded containers (7) towards the main accumulation unit (2) in order to place them along a portion of trajectory (11) directed towards the reception opening (4) of the main accumulation unit.

12. The device according to claim 1, comprising first and second transporting means (42) active on the containers (7) in transit along the trajectories of the main accumulation unit (2) and second accumulation unit (10) not affected by the first and second drive means (20, 21), in order to accumulate the containers filled with products in a position abutting each other along said first (8c) and third branch (11a), respectively, and to accumulate the containers unloaded of products in a position abutting each other along the respective portions of trajectories (8, 11) extending downstream of the first (6) and the second delivery opening (13) of the main accumulation unit (2) and the second accumulation unit (10), respectively.

13. The device according to claim 12, wherein said transport means (42) comprise two pairs of chains (43), each pair extending parallel with and spaced from the other pair, closed in a loop coaxially to each other and provided with idler rollers (46) pivoted on chain pins (47) capable of supporting respective opposing lateral ends of each container (7).

14. The device according to claim 12, further comprising stop means (49*a*) near the second end (11") of said second trajectory (11) of the second accumulation unit (10), said stop means (49*a*) being operable between a first operating condition in which they are active on the containers (7) to stop them abutting each other, following the continuous movement of the corresponding transporting means (42), and a second non-operating condition in which they are disengaged from the containers (7) to allow the passage thereof from the second accumulation unit (10) to the main accumulation unit (2) at the end (11") connecting the respective trajectories (8, 11).

15. The device according to claim 14, wherein said stop means (49*a*) are operated between said first and second condition so that the passage of a container (7) unloaded of products and accumulated in the second accumulation unit (10) does not interfere with the passage of unloaded containers from the first delivery opening (6) of the main accumulation unit conveyed towards the reception opening (4).

16. The device according to claim 3, wherein each of said pusher members is provided with a respective terminal (71) connected to the rod of a respective pneumatic cylinder actuator of the corresponding pusher device (61, 62), said terminal having a recess (76) capable of forming a positive-locking fit with a respective block (77) mounted on the respective lateral flank of the container (7), so that, by means of reciprocal engagement of the block and recess, the pusher device and the corresponding container are connected in translation.

17. The device according to claim 1, wherein said containers (7) are provided for the containment of products (P) arranged in rows.

\* \* \* \* \*